(12) United States Patent
Hoshi et al.

(10) Patent No.: US 8,093,766 B2
(45) Date of Patent: Jan. 10, 2012

(54) CYLINDRICAL LINEAR MOTOR ARMATURE, CYLINDRICAL LINEAR MOTOR FIELD POLE, AND CYLINDRICAL LINEAR MOTOR USING THEM

(75) Inventors: Toshiyuki Hoshi, Kitakyushu (JP); Toru Takano, Kitakyushu (JP); Masahiko Tanabe, Kitakyushu (JP); Takahisa Yamada, Kitakyushu (JP); Seigo Nagamatu, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 208 days.

(21) Appl. No.: 12/373,459

(22) PCT Filed: Jul. 10, 2007

(86) PCT No.: PCT/JP2007/063738
§ 371 (c)(1),
(2), (4) Date: Feb. 10, 2009

(87) PCT Pub. No.: WO2008/013053
PCT Pub. Date: Jan. 31, 2008

(65) Prior Publication Data
US 2009/0289509 A1    Nov. 26, 2009

(30) Foreign Application Priority Data
Jul. 26, 2006    (JP) ................................. 2006-203392

(51) Int. Cl.
*H02K 41/00* (2006.01)
*H02K 41/03* (2006.01)
(52) U.S. Cl. ..................... 310/14; 310/12.02; 310/12.24; 310/12.25; 310/156.18; 310/156.22; 310/12.33; 310/216.127

(58) Field of Classification Search ............... 310/12.33, 310/14, 216.127, 12.24, 12.25, 12.22, 156.18, 310/12.02; H02K 41/00, 41/03
See application file for complete search history.

(56) References Cited

U.S. PATENT DOCUMENTS
4,785,816 A * 11/1988 Dow et al. ..................... 600/446
(Continued)

FOREIGN PATENT DOCUMENTS
CN    85200996 U    1/1986
(Continued)

OTHER PUBLICATIONS
Machine translation of 11309526 Suzuki et al.*
(Continued)

*Primary Examiner* — Quyen Leung
*Assistant Examiner* — Terrance Kenerly
(74) *Attorney, Agent, or Firm* — Westerman, Hattori, Daniels & Adrian, LLP

(57) ABSTRACT

A cylindrical linear motor capable of solving the problem that a leak flux links an aluminum frame at both ends of an armature of a conventional cylindrical linear motor, which causes a viscous braking force as a motor brake force, is provided. The cylindrical linear motor armature 20 includes a plurality of cylindrical coils 20a arranged in the axial direction in a cylindrical yoke 20b formed by a magnetic material and frames 20d and 20e covering the outside of the cylindrical yoke 20b. Only in the axial direction region of the frame 20d where the cylindrical yoke 20b exists, the frame 20d is formed by an aluminum frame 20d, and the axial direction both end portions are formed by a resin cap 20e.

8 Claims, 4 Drawing Sheets

U.S. PATENT DOCUMENTS

| | | | |
|---|---|---|---|
| 5,345,206 A * | 9/1994 | Morcos | 335/222 |
| 5,434,549 A * | 7/1995 | Hirabayashi et al. | 335/229 |
| 5,872,407 A * | 2/1999 | Kitaoka et al. | 310/12.14 |
| 6,326,706 B1 * | 12/2001 | Zhang | 310/12.31 |
| 6,800,966 B2 * | 10/2004 | Godkin | 310/12.25 |
| 7,633,189 B2 * | 12/2009 | Iwasa et al. | 310/14 |
| 2001/0033110 A1 | 10/2001 | Pulford, Jr. | |
| 2004/0095219 A1 * | 5/2004 | Kelly | 335/229 |
| 2004/0164623 A1 | 8/2004 | Suzuki et al. | |
| 2004/0263003 A1 * | 12/2004 | Jack et al. | 310/14 |
| 2005/0280316 A1 * | 12/2005 | Nozawa et al. | 310/12 |
| 2006/0028072 A1 | 2/2006 | Iwasa et al. | |
| 2007/0205672 A1 | 9/2007 | Nozawa et al. | |

FOREIGN PATENT DOCUMENTS

| | | |
|---|---|---|
| CN | 1058494 A | 2/1992 |
| CN | 2101967 U | 4/1992 |
| JP | 1-190250 A | 7/1989 |
| JP | 11-225468 A | 8/1999 |
| JP | 11-309526 A | 11/1999 |
| JP | 2000-320745 A | 11/2000 |
| JP | 2002-27730 A | 1/2002 |
| JP | 2002-238239 A | 8/2002 |
| JP | 2002-272075 A | 9/2002 |
| JP | 2004-260950 A | 9/2004 |
| JP | 2005-039941 A | 2/2005 |
| JP | 2006-050864 A | 2/2006 |
| JP | 2007-43780 A | 2/2007 |
| WO | 2005/124979 A1 | 12/2005 |
| WO | 2005/124981 A1 | 12/2005 |

OTHER PUBLICATIONS

International Search Report of PCT/JP2007/063738, Mailing Date of Oct. 23, 2007.

* cited by examiner

CYLINDRICAL LINEAR MOTOR ARMATURE, CYLINDRICAL LINEAR MOTOR FIELD POLE, AND CYLINDRICAL LINEAR MOTOR USING THEM

TECHNICAL FIELD

The present invention relates to a cylindrical linear motor capable of attaining high performance by arranging a cylindrical yoke around a pipe-shaped field pole via an air gap. More specifically, the present invention relates to the structure of a cylindrical linear motor armature, a cylindrical linear motor field pole and a cylindrical linear motor using them.

BACKGROUND TECHNIQUE

FIG. 5 shows a schematic side view of a conventionally known cylindrical linear motor, and FIG. 6 is a side cross-sectional view thereof. A cylindrical linear motor according to the present invention includes, as shown in FIG. 5, a stator having a field pole 10, and a mover having an armature 20 coaxially arranged around the field pole 10. The present invention relates to improvements of the field pole 10 and the armature 20.

The field pole 10 includes, as shown in FIG. 6, a plurality of cylindrical columnar magnets 10a each magnetized in the axial direction, cylindrical columnar pole pieces 10b made of a magnetic material each disposed between adjacent magnets 10a, a stainless steel pipe 10c housing the magnets 10a and the pole pieces 10b therein, and end blocks 10d provided at both axial ends of the stainless steel pile 10c. The magnets 10a are arranged so that the magnetic direction changes alternatively. In other words, the adjacent magnets are arranged so that the same magnetic poles N or S face each other. The end blocks 10d are attached to both end portions of the stainless steel pipe 10c to bear against the repulsion force generated between the magnets.

On the other hand, the armature 20 includes, as shown in FIG. 6, cylindrical coils 20a, a cylindrical yoke 20b made of a magnetic material, and an aluminum frame 20d. That is, a plurality of cylindrical coils 20a are arranged in the axial direction and disposed inside of the cylindrical yoke 20b, and the aluminum frame 20d is provided outside of the cylindrical yoke 20b. The frame 20d is made of aluminum to secure the mechanical rigidity of the armature 20 and reduce the weight of the armature 20.

The field pole 10 and the armature 20 are disposed coaxially via a magnetic gap to thereby constitute a linear motor in which the field pole 10, as a stator 1, and the armature 20, as a mover, can move relatively.

The use of the cylindrical yoke 20b increases the gap magnetic flux density, resulting in a high-performance motor. Furthermore, inducing the flux generated from the field pole 10 into the cylindrical yoke 20b reduces the flux leakage to the aluminum frame 20d, which in turn can restrain the viscous braking force.

As to the end block 10d tightly fixed to the end portion of the stainless steel pipe 10c which accommodates a plurality of magnets 10a with the same magnetic poles facing with each other, such end block is disclosed in, for example, Patent Document 1. FIG. 7 is a cross-sectional view showing a stator 1 for explaining an end block.

In FIG. 7, "70" denotes a field pole, "70a" denotes each of a plurality of magnets arranged with the same magnetic poles facing with each other, "70c" denotes a pipe made of a non-magnetic material for covering the outer periphery of the magnets, "70e" denotes a shaft made of a non-magnetic material with threaded end portions, the shaft penetrating all of the magnets 70a, and "70d" denotes an end block into which the threaded portion of the shaft 70e is screwed. It is constituted such that a driving force is generated in the axial direction of the stator by the leakage flux generated from the magnets 70a and the energized coils in the mover 10. The fastening of the stator is performed by tightening the end block 70d to the threaded portion 70f of the shaft 70e.

DISCLOSURE OF THE INVENTION

Problems to be Solved by the Invention

However, there is a drawback that, at around both end portions of the armature 20 shown in FIG. 6, the flux leaked from the field pole 10 links the aluminum frame 20d to cause eddy currents, resulting in generation of a viscous braking force.

Furthermore, in the cylindrical linear motor as shown in FIG. 7, the shaft 70e has to penetrate all of the magnets 70a. Therefore, in the case of extending the armature 20 by increasing the width of each magnet 70a or increasing the number of the magnets 70a, the shaft 70e is also required to have the same length as the extended length of the armature 20. Therefore, it is not suitable to produce a long armature 20.

Furthermore, it is required to prepare shafts 70e having a length corresponding to the length of an armature 20, which is problematic in terms of cost, production, and storage.

The end block 70d and the shaft 70e are connected only by the thread tightening therebetween. Therefore, if the thread tightening comes loose or the threads become worn, there is a problem that the repulsion force of the magnets cause destruction of the field pole 70 together with the end block 70d.

The present invention was made in order to solve the aforementioned problems, and aims to provide a cylindrical linear motor decreased in viscous braking force to a maximum extent, excellent in production/fabrication performance, and low in price.

Means to Solve the Problems

In order to solve the aforementioned problems, the present invention is constructed as follows.

According to an embodiment of the invention, in a cylindrical linear motor armature in which a plurality of cylindrical coils are arranged in an axial direction inside a cylindrical yoke formed by a magnetic material and an outside of the cylindrical yoke is covered by a frame, it is characterized in that the frame is formed by a resin material whose electrical conductivity is nearly zero.

According to another embodiment of the invention, in the cylindrical linear motor armature as recited in the embodiment described above, it is characterized in that only in an axial direction region of the frame where the cylindrical yoke exists, the frame is formed by an aluminum frame, and in the axial direction both end portions of the armature are formed by a resin cap.

According to another embodiment of the invention, in the cylindrical linear motor field pole in which a plurality of cylindrical columnar magnets magnetized in an axial direction thereof are arranged in a stainless steel pipe with the same magnetic N or S poles facing each other, and end blocks are arranged at both ends of the stainless steel pipe, it is characterized in that the end block is constituted by an end block equipped with a bolt.

According to another embodiment of the invention, in a cylindrical linear motor field pole in which a plurality of cylindrical columnar magnets magnetized in an axial direction thereof are arranged in a stainless steel pipe with the same magnetic N or S poles facing with each other, and end blocks arranged at both ends of the stainless steel pipe, it is characterized in that the end block is constituted by an end block equipped with a pin.

According to another embodiment of the invention, in the cylindrical linear motor field pole as recited in the embodiments described above, it is characterized in that the end block has threads on an outer surface thereof, and the pipe has threads corresponding to the threads of the end block on an inner surface of the pipe so that the end block can screw into the pipe.

According to another embodiment of the invention, in the cylindrical linear motor field pole as recited in the embodiments described above, it is characterized in that the end block has a recess with respect to the pipe, and the pipe is deformed so as to fit in the recess after fitting the end block into the pipe.

According to another embodiment of the invention, in the cylindrical linear motor field pole as recited in the embodiments described above, it is characterized in that the end block and the pipe are fixed with each other by welding.

According to another embodiment of the invention, in a cylindrical linear motor field pole in which a plurality of cylindrical columnar magnets magnetized in an axial direction thereof are arranged in a stainless steel pipe with the same magnetic N or S poles facing each other, and end blocks are arranged at both ends of the stainless steel pipe, it is characterized in that the end block is formed by an end block having threads on an outer surface thereof, and the end block is screwed in the pipe to press the magnets to thereby cause close contact of the magnets with no gap, and that the end block has a recess with respect to the pipe, and wherein the pipe is deformed so as to fit in the recess after fitting the end block into the pipe.

According to another embodiment of the invention, in a cylindrical linear motor field pole in which a plurality of cylindrical columnar magnets magnetized in an axial direction thereof are arranged in a stainless steel pipe with the same magnetic N or S poles facing each other, and end blocks are arranged at both ends of the stainless steel pipe, it is characterized in that the end block is formed by an end block having threads on an outer surface thereof, and the end block is screwed into the pipe to press the magnets, to thereby cause close contact of the magnets with no gap, and the end block and the pipe are fixed with each other by welding.

According to another embodiment of the invention, in the cylindrical linear motor field pole as recited in the embodiments described above, it is characterized in that a cylindrical columnar pole piece made of a magnetic material is disposed between the magnets.

According to another embodiment of the invention, in a cylindrical linear motor, it is characterized in that a pipe-shaped field pole is coaxially arranged in a hollow space of the cylindrical armature as recited in the above embodiments via a magnetic gap so that the field pole and the armature can move relatively.

According to another embodiment of the invention, in a cylindrical linear motor, it is characterized in that the field pole as recited in any one of the embodiments described above is coaxially arranged in a hollow space of a cylindrical armature via a magnetic gap so that the field pole and the armature can move relatively.

According to another embodiment of the invention, in a cylindrical linear motor, it is characterized in that the field pole as recited in any one of the embodiments described above is coaxially arranged in a hollow space of the cylindrical armature as recited in the embodiments described above via a magnetic gap so that the field pole and the armature can move relatively.

Effects of the Invention

With the aforementioned structure, a high-performance cylindrical linear motor suppressed in viscous braking force to a maximum extent can be obtained.

Furthermore, even if the stator becomes long by increasing the width of the magnet or the number of magnets, it is possible to provide a high-performance cylindrical linear motor which is not required to change the shaft length and therefore which is suitable to produce a long stator, and which has no fear that the stator is destroyed together with the end block by the repulsion force of the magnets due to the losening or abrasion of the threaded portions of the shaft and/or the end block.

DESCRIPTION OF THE REFERENCE NUMERAL

Figure 1:
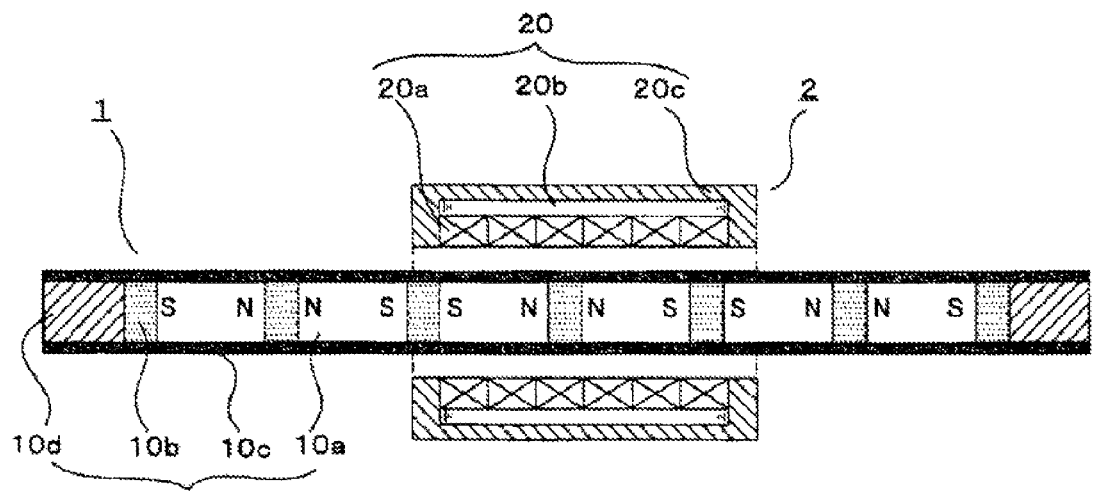
FIG. 1 is a cross-sectional view of a cylindrical linear motor according to Example 1 of the present invention.

1 Stator having a field pole
10 field pole
10*a* magnet
10*b* pole piece
10*c* stainless steel pipe
10*d* end block
2 mover having an armature
20 armature
20*a* cylindrical coil
20*b* cylindrical yoke
20*c* resin frame
20*d* aluminum frame
20*e* resin cap
30, 30' field pole
30*a* magnet
30*c* stainless steel pipe
30*d* end block
30*f* bolt
30*g* pin
40 field pole
40*a* magnet
40*c* pipe 40d end block
40f bolt
40g pin
40h recess (deformation)
70 field pole
70a magnet
70c pipe
70d end block
70e shaft
70f threaded portion

BEST MODE FOR CARRYING OUT THE
INVENTION

Hereinafter, the present invention will be explained with reference to the drawings.

EMBODIMENT 1

FIG. 1 is a cross-sectional view showing a cylindrical linear motor according to Embodiment 1 of the present invention.

In FIG. 1, "10" denotes a field pole, "10a" denotes each of a plurality of cylindrical columnar magnets each magnetized in the axial direction, and "10b" is a cylindrical columnar pole piece made of a magnetic material disposed between the magnets 10a. By disposing the pole piece 10b between the magnets 10a, the space magnetic flux density becomes a nearly sinusoidal distribution and the induction voltage generated by an armature coil becomes larger in absolute value and a nearly sinusoidal distribution, which effectively directs the magnetic field line toward the armature 20 in an efficient manner. This in turn results in an improved motor constant and decreased thrust ripples. Therefore, it is preferable to dispose the pole piece between the magnets, but it is not essential to do so. "10c" denotes a stainless steel pipe for accommodating the magnets 10a and the pole pieces 10b therein, and "10d" denotes an end block for closing the end portion of the stainless steel pipe 10c.

The stator 1 is constituted by the aforementioned elements.

On the other hand, a mover 2 includes an armature 20, cylindrical coils 20a, a cylindrical yoke 20b made of a magnetic material, and a resin frame 20c.

The field pole 10 and the armature 20 mentioned above are arranged coaxially via a magnetic gap to thereby constitute a linear motor in which the field pole 10 as a stator 1 and the armature 20 as a mover 2 can move in a relative manner.

As mentioned above, the frame 20c covering the outside of the cylindrical yoke 20b is made of a resin material, and therefore the electric conductivity is nearly 0 (zero). Therefore, even if the magnetic flux leaked from the field pole links the resin frame 20c at around both end portions of the armature 20, no eddy current will be generated. Thus, no eddy current braking (viscous braking force) will be generated.

EMBODIMENT 2

Figure 2:
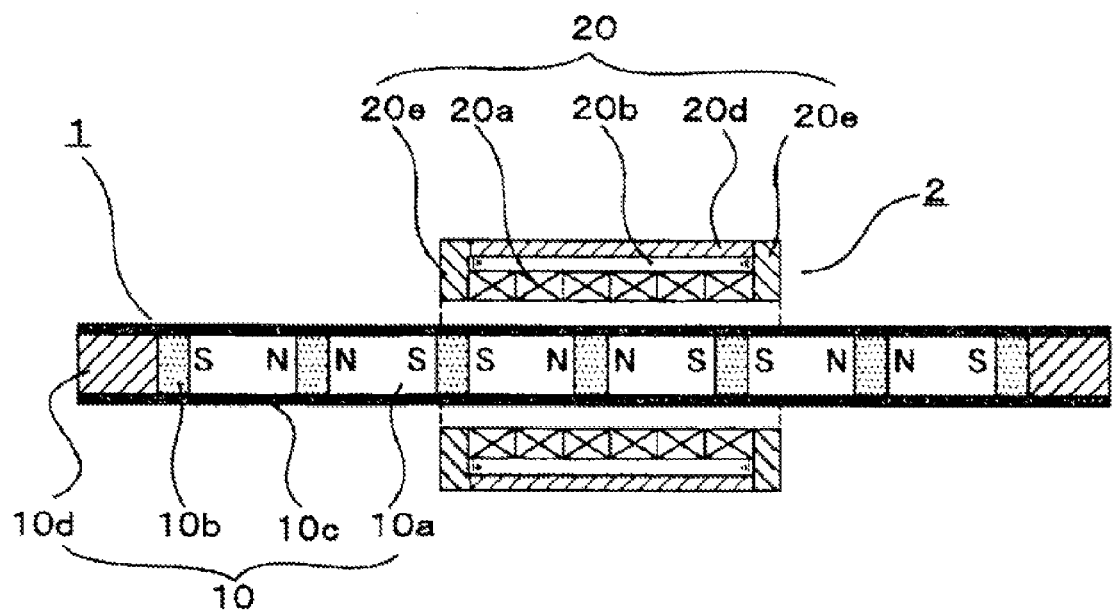
FIG. 2 show a cylindrical linear motor according to Example 2 of the present invention.

FIG. 2 is a cross-sectional view showing a cylindrical linear motor according to Embodiment 2 of the present invention.

In FIG. 2, the same reference numeral is allotted to the same element as in FIG. 1, and therefore the cumulative explanation will be omitted. Embodiment 2 differs from Embodiment 1 in that a region of the frame where the cylindrical yoke 20b exits in the axial direction is formed by an aluminum frame 20d and end portions of the armature 20 are each formed by a resin cap 20e.

In the region where the cylindrical yoke 20b exists, the magnetic flux generated by the field pole 10 is induced in the cylindrical yoke 20b, causing no magnetic flux leakage to the aluminum frame 20d. Therefore, almost no viscous braking force will be generated. Furthermore, both the end portions 20e of the armature 20 is made of a resin material, and therefore even if magnetic flux leaks from the field pole 10, no eddy current will be generated. Therefore, no viscous braking force will be generated. In addition, since the viscous braking force is extremely reduced and the frame is formed by an aluminum member, the mechanical rigidity of the armature 20 has been secured.

EMBODIMENT 3

FIG. 3 is a cross-sectional view showing a field pole of a cylindrical linear motor according to Embodiment 3 of the present invention. FIG. 3 shows a stator (field pole 30) having a function of pressing magnets 30a in which the outer periphery of the magnets 30a is covered by a pipe 30c made of a non-magnetic material, and a bolt 30f is mounted to the end block 30d fitted in the pipe 30c. The bolt 30f is screwed into the end block 30c from one side of the pile 30c to thereby attain close contact of the magnets 30a. Thus, the end blocks 30d are fitted in the pipe 30c.

Embodiment 3 differs from the invention described in Patent Document 1 in the following points. That is, Embodiment 3 does not require the shaft 70e (see FIG. 7) which penetrates the entire stator in the axial direction. Embodiment 3 is equipped with the bolt 30f attached to one of the end blocks 30d, which enables close contact of the magnets 30a regardless of the length of the stator 30 (see FIG. 3). Furthermore, in Patent Document 1, the fastening in the stator 70 is performed only between the end blocks 70d and the shaft 70e. On the other hand, in Embodiment 3, the fastening is performed, in addition to the fastening between the end block 70d and the bolt 30f, between the pipe 30c and end blocks 30d.

Figure 3A:
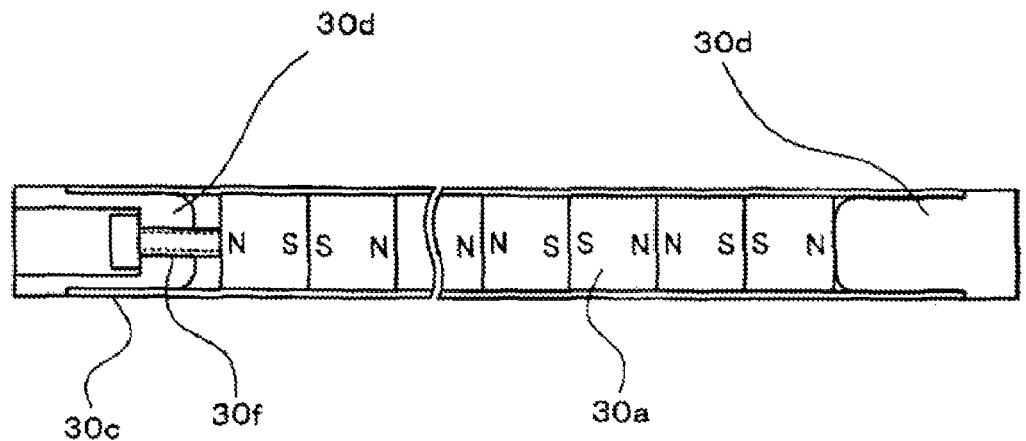
FIG. 3 shows a field pole of a cylindrical linear motor according to Example 3 of the present invention, wherein FIG. 3(*a*) shows a first embodiment, and FIG. 3(*b*) shows a modification thereof.

As shown in FIG. 3(a), by screwing the bolt 30f into one of the end blocks 30d of the pipe 30c, it becomes possible to attain close contact of the magnets 30a without requiring the shaft 70e (see FIG. 7) having the same length as that of the stator.

Figure 7:
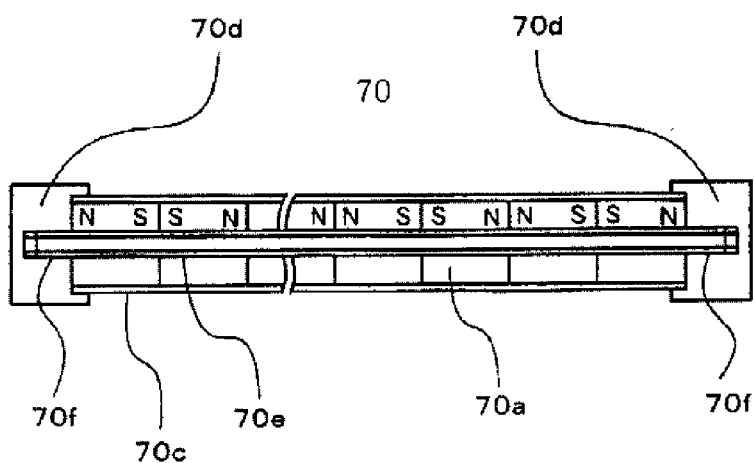
FIG. 7 is a cross-sectional view showing a field pole and its vicinity of a conventionally known cylindrical linear motor.

Furthermore, it is not required to penetrate the shaft 70e as shown in FIG. 7 into the central portion of the magnet 30a, and therefore it becomes possible to increase the magnetic flux of the magnet 30a to a maximum extent, which enables improvements on motor characteristics.

Furthermore, the pipe 30c and the end blocks 30d are fastened. Therefore, in the unlikely event of loosening or abrasion of the bolt 30f, it is possible to bear against the repulsive force of the magnets 30a by the fastening of the end blocks to the pipe 30c. This prevents breakage of the stator 30, which makes it possible to maintain the function as a cylindrical linear motor.

Figure 3B:
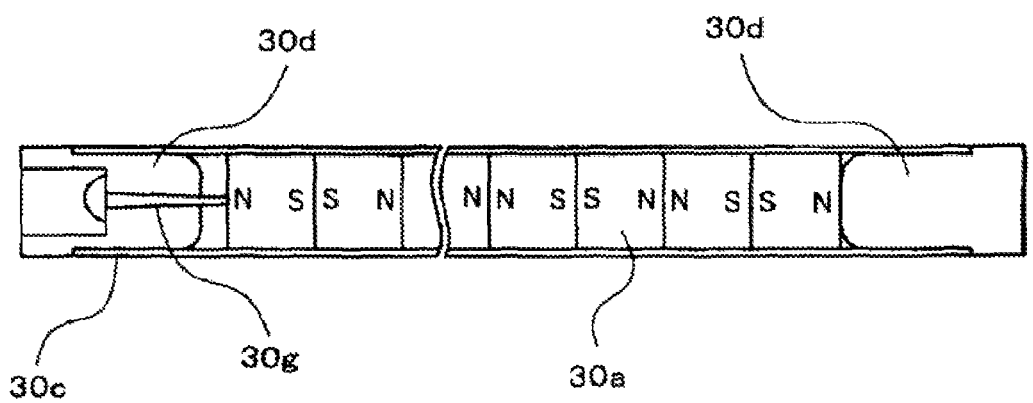

FIG. 3(b) shows a modification of Embodiment 3 in which a pin 30g is used in place of the bolt 30f shown in FIG. 3(a). By driving the pin 30g into one of the end blocks 30d positioned at both ends of the pipe 30c from one side, it becomes possible to attain close contact of the magnets 30a without using the shaft 70e (see FIG. 7) having the same length as that of the stator 30'.

In this case, it is required that the pin 30g is fitted in the end block 30d.

The bolt 30f or the pin 30g can be attached to one of the end blocks 30d or both the end blocks 30d. However, it is preferable to attach it to one of the end blocks for structural simplification.

EMBODIMENT 4

Figure 4:
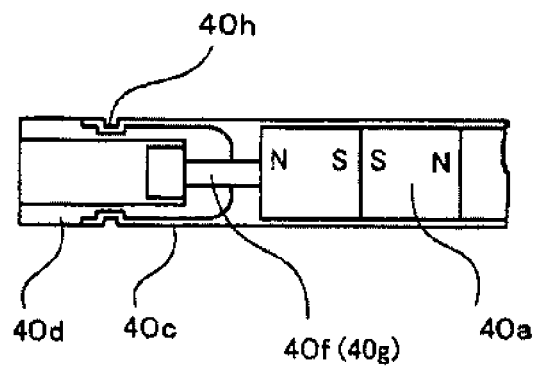
FIG. 4 shows a field pole of a cylindrical linear motor according to Example 4 of the present invention.
Figure 5:
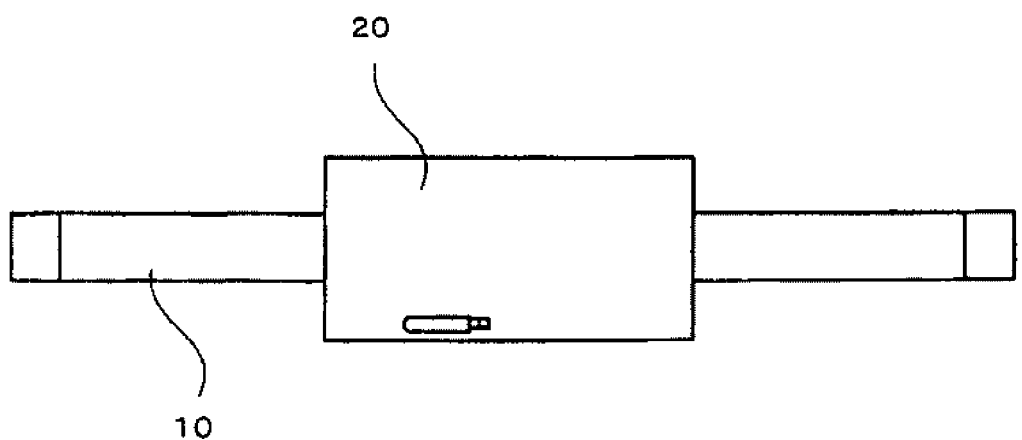
FIG. 5 is a view showing an external appearance of a cylindrical linear motor.
Figure 6:
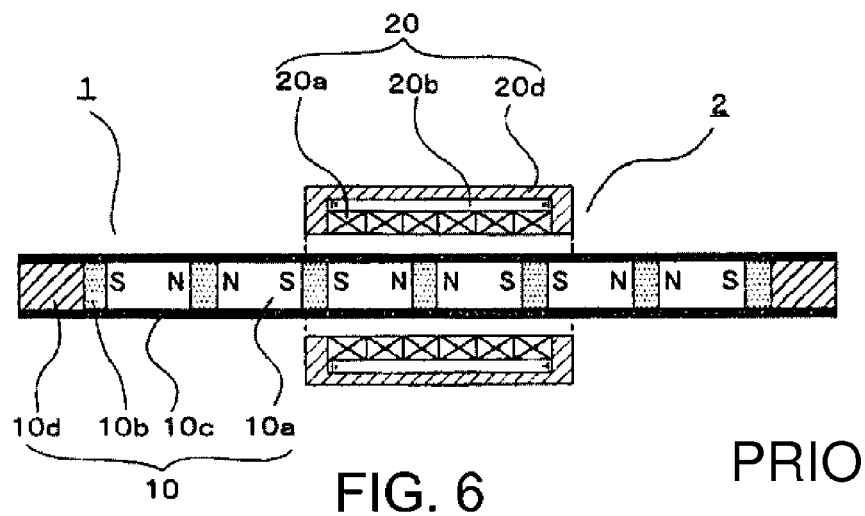
FIG. 6 is a cross-sectional view of a conventionally known cylindrical linear motor.

FIG. 4 is a cross-sectional view showing a field pole of a cylindrical linear motor according to Embodiment 4 of the present invention. This cross-sectional view shows the mechanical fastening of the pipe 40c to the end block 40c in detail. The end block 40d has a recess 40h with respect to the pipe 40c so that the pipe 40c can be deformed into the same configuration as that of the recess 40h after the fitting to the pipe 40c to secure the end block to the pipe 40c. In other words, in place of the fitting between the pipe 30c and the end block 30d in Embodiment 3, a recess 40h with respect to the pipe 40c is previously formed on the end block 40d so that the same function can be fulfilled by deforming the configuration of the pipe 40c along the recess of the end block 70d after the insertion of the end block into the pipe 40c.

This function also can be attained by adhering the pipe 40c and the end block 40d. However, it is preferable that the end block is constituted by an end block to which a bolt or a pin is attached or that the fastening is a mechanical fastening such as welding or screwing.

EMBODIMENT 5

Embodiment 5 of the present invention is constructed as follow. For example, in the embodiment shown in FIG. 1, threads are formed on the outer periphery of the end block 10d, and also threads are formed on the corresponding inner periphery of the stainless steel pipe 10c. Then, by screwing the end block 10d into the stainless steel pipe 10c, the end block is securely fastened to the pipe.

By combining this structure with the structure in which the pipe 30c and the end block 30d are fitted as shown in Embodiment 3 or the structure in which a recess for the pipe 40c is previously formed on the end block 40d and the configuration of the pipe 40c is deformed along the recess of the end block 70d after the insertion of the end block into the pipe 40c, synergistic effects can be obtained.

With the aforementioned structure, a high-performance cylindrical linear motor suppressed in viscous braking force to a maximum extent can be obtained. Furthermore, even if the stator becomes long by increasing the width of the magnet or the number of magnets, it is possible to provide a high-performance cylindrical linear motor which is not required to change the shaft length and therefore which is suitable to produce a long stator, and which has no fear that the stator is destroyed together with the end block by the repulsion force of the magnets due to the loosening or abrasion of the threads of the shaft and the end block.

INDUSTRIAL APPLICABILITY

As described above, in the present invention, by arranging a cylindrical yoke around a periphery of a pipe-shaped field pole via an air gap, it becomes possible to provide a cylindrical linear motor suppressed in viscous braking force to a maximum extent, excellent in productive/fabrication performance, and low in cost. Therefore, the present invention can be preferably applied to a transportation apparatus, etc., requiring high-speed driving used in various fields.

What is claimed is:

1. A cylindrical linear motor comprising:
    an armature formed by a plurality of cylindrical coils arranged in an axial direction inside a cylindrical yoke formed by a magnetic material and a frame covering the outside of the cylindrical yoke, and
    a field pole which is coaxially arranged in a hollow space of the armature via a magnetic gap, as well as formed by a plurality of cylindrical columnar magnets magnetized in an axial direction arranged inside a stainless steel pipe with the same magnetic N or S poles facing each other, and end blocks are arranged at both ends of the stainless steel pipe, wherein
    the field pole and armature move relatively,
    the frame is formed by a resin material whose electric conductivity is nearly zero, and
    the end block is formed by an end block mounted with either a bolt or a pin which is forced in an array direction of a magnetic pole, the bolt or pin pressing the cylindrical columnar magnets to attain close contact between the cylindrical columnar magnets in the array direction.

2. The cylindrical linear motor armature as recited in claim 1, wherein
    the frame is aluminum in an axial direction region where the cylindrical yoke exists, and
    both end portions of the armature, in an axial direction, are formed by a resin cap.

3. The cylindrical linear motor as recited in claim 1, wherein the end block has threads cut on its outside diameter, and
    the pipe has similar threads on its inner diameter so that the end block can screw into the pipe.

4. The cylindrical linear motor as recited in claim 1, wherein
    the end block has a recess with respect to the pipe, and
    the pipe is deformed so as to fit in the recess after fitting the end block into the pipe.

5. The cylindrical linear motor as recited in claim 1, wherein
    the end block is formed by an end block having threads formed on its outside diameter, and by acting in the direction in which the magnets are pressed by screwing the end block into the pipe, the gap between the magnets closes into contact, and
    the end block has a recess with respect to the pipe, and the pipe is deformed so as to fit in the recess after fitting the end block into the pipe.

6. The cylindrical linear motor as recited in claim 1, wherein
    the end block is formed by an end block having threads formed on its outside diameter, and by acting in the direction in which the magnets are pressed by screwing the end block into the pipe, the gap between the magnets closes into contact, and
    the end block and the pipe are fixed to each other by welding.

7. The cylindrical linear motor as recited in claim 1, wherein
    a cylindrical columnar pole piece made of a magnetic material is disposed between each of the magnets.

8. A delivery device, wherein
    the cylindrical linear motor as recited in claim 1 is used in a drive motor.

* * * * *